J. B. Sawyer,
Harvester Dropper.

No. 102,439.　　　　　　　　　　Patented April 26, 1870.

Witnesses　　　　　　　Inventor
Thos. H. Dodge　　　　　J. B. Sawyer
Geo. H. Miller

UNITED STATES PATENT OFFICE.

JOSEPH B. SAWYER, OF TEMPLETON, MASSACHUSETTS.

IMPROVEMENT IN DROPPING-PLATFORM FOR HARVESTERS.

Specification forming part of Letters Patent No. 102,439, dated April 26, 1870.

*To all whom it may concern:*

Be it known that I, JOSEPH B. SAWYER, of Templeton, in the county of Worcester and Commonwealth of Massachusetts, have invented certain new and useful Improvements in Harvesters; and I do hereby declare the following to be a full, clear, and exact description of the same, reference being had to the accompanying drawings, forming part of this description, and in which—

Figure 1:
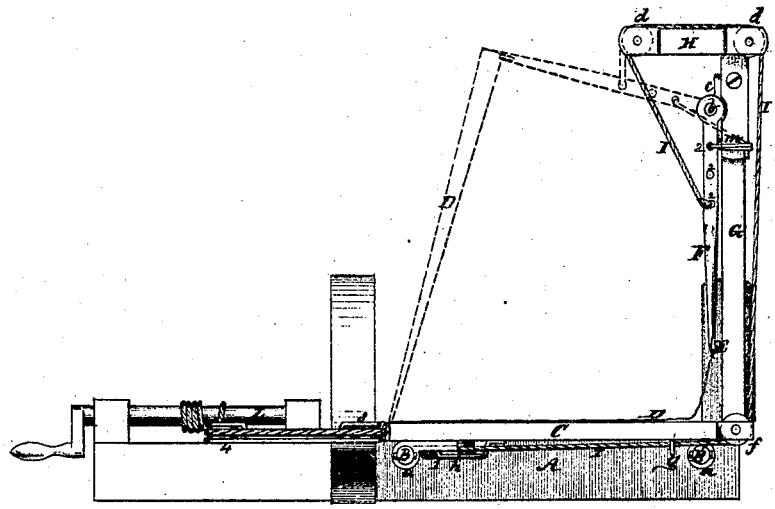
Figure 2:
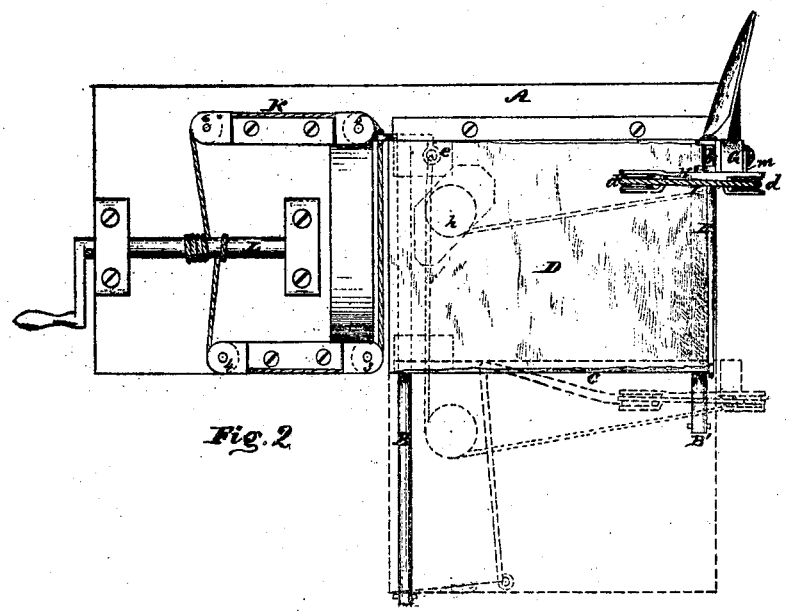

Figure 1 represents a rear view of so much of a harvesting-machine as is necessary to illustrate my present improvement, and Fig. 2 represents a plan or top view of the same, the discharging-apron being shown in an elevated position by dotted lines in both figures.

To enable those skilled in the art to which my invention belongs to make and use the same, I will proceed to describe it more in detail.

The nature of my invention consists, first, in the combination, with the finger-bar of a harvesting-machine, of a flexible reciprocating elevating and discharging apron, substantially as and for the purposes hereinafter set forth; second, in the combination, with a flexible reciprocating apron, of the mechanism for elevating and depressing the same to discharge the gavel, substantially as hereafter explained.

In the drawings, A represents the finger-bar, which may be made and attached to the machine in the usual manner. To the rear of the finger-beam are secured two supporting rods or ways, B B', upon which rests a platform, C, and which is secured to the rods or ways B B' by means of loop-bearing pieces $a$ $a$.

To the inner edge of the platform C is secured the inner end of the gavel-discharging apron D, while the outer end of the apron is attached to and supported by the finger E, which projects back in a horizontal position, or nearly so, from the lower end of the elevating-arm F, the upper end of which arm F is attached to a journal, $b$, which turns in ear or bearing pieces $c$, fastened to the upper end of the post G, which is supported upon the outer front corner of the platform C.

A pulley-supporting piece, H, is fastened to the top of the post G, and is provided with two pulleys, $d$ $d$, over which a cord or chain, I, passes, one end of said cord being fastened to the arm F, while the other end is fastened to a hook or loop in the rear of the finger-bar, as shown in dotted lines at $c$, Fig. 2. Cord or chain I passes down under a pulley, $f$, in the outer edge of the platform C, thence through a guide or loop, $g'$, in the bottom of the platform, and then around a friction-pulley, $h$, also on the bottom of the platform C, before it is fastened to the loop or hook $e$. A shield-piece, 1, is fastened to the under side of the platform C, to protect pulley $h$ and keep the cord or chain I in place on said pulley. A spring, $m$, is fastened to the post G, and also to the arm F, in such a manner that the contraction of the spring $m$ tends to draw arm F up against the post G.

From the foregoing description it will be seen that, when the platform C is run or moved back upon the rods or ways B B', as shown in dotted line, Fig. 2, the cord or chain I will be drawn out over the pulleys $d$ $d$, thereby elevating arm F, finger E, and apron D to the position shown in dotted lines, Fig. 1, and by which operation the stalks of grain deposited upon the apron D, while resting upon the platform C in the position shown in dark lines, same figure, will be discharged in a compact gavel upon the ground to the left of the platform C and in rear of the machine.

To prevent the raising of the apron D before it has been moved back sufficiently far to clear the rear of the machine when the gavel is discharged from the apron, the cord or chain I should be slack enough so as not to elevate the arm F and apron D until the platform and apron have been moved back to the desired position before the discharging operation commences.

To prevent the tangling of the cord or chain I, a spring or weight may be arranged to take up the slack, said spring or weight being attached to the post G or the piece H, and arranged to operate as a take-up, similar to the thread take-up in sewing-machines.

The upper end of the arm F is provided with a series of holes, 2, and into either one of which the end of cord or chain I may be tied or fastened.

It will be observed that the nearer cord I is fastened to the journal $b$ the less will be the motion of the platform required to raise arm F, finger E, and apron D to discharge the gavel.

In lieu of holes 2, pulleys of different sizes may be fastened to the journal $b$, to which the end of cord I may be fastened. The larger the pulley the greater the motion of the platform required to elevate apron D to discharge the gavel.

My invention is applicable to front as well as rear cut machines, since any desired back motion may be given to the platform before the gavel is discharged.

In rear-cut machines the platform will have to be moved but a short distance.

My invention is designed to be used more particularly in connection with the cut-off and reel arrangement employed in harvesting-machines in which the grain is deposited upon the ground by the dropping of the platform.

The platform C may be made of slats, or in any other suitable manner which combines the necessary strength, and may be moved back and forth upon the ways or rods B B′ by any suitable mechanism. In this instance a cord, K, is fastened to the front inner corner, $n$, of the platform, one end of said cord being passed back around the pulleys 3 and 4, and then fastened to the shaft L, while the other end of the cord is passed around the pulleys 5 and 6, and is then in turn fastened to the same shaft, as indicated in Fig. 2. By this arrangement, when shaft L is turned in one direction one end of the cord will be wound up while the other is being unwound, and consequently the platform will be moved back or forward, as the case may be, depending upon the direction in which the shaft L is turned. By combining with the shaft L a double clutch and gear arrangement, any desired backward and forward motion can be given to the platform C and discharging-apron D, at the will of the driver or operator.

It will be understood that in applying the invention to different machines the mechanism for operating the platform back and forth will have to be adjusted to suit such machines.

From the foregoing description those skilled in the art will be able to apply my invention for discharging the cut grain in gavels upon the ground to the various harvesting-machines now in use.

Having described my improvements in harvesters, what I claim therein as new and of my invention, and desire to secure by Letters Patent, is—

1. The combination, with the finger-bar of a harvesting-machine, of a flexible reciprocating elevating discharging-apron, substantially as and for the purposes set forth.

2. The combination, with the flexible reciprocating and discharging apron, of the mechanism, substantially as described, for elevating and depressing the same.

J. B. SAWYER.

Witnesses:
   THOS. H. DODGE,
   GEO. H. MILLER.